Feb. 11, 1964 H. ORENSTEIN 3,120,716
SIMULATED AUTOMOBILE DASHBOARD AND CONTROL MEANS
Filed Feb. 19, 1962 5 Sheets-Sheet 2
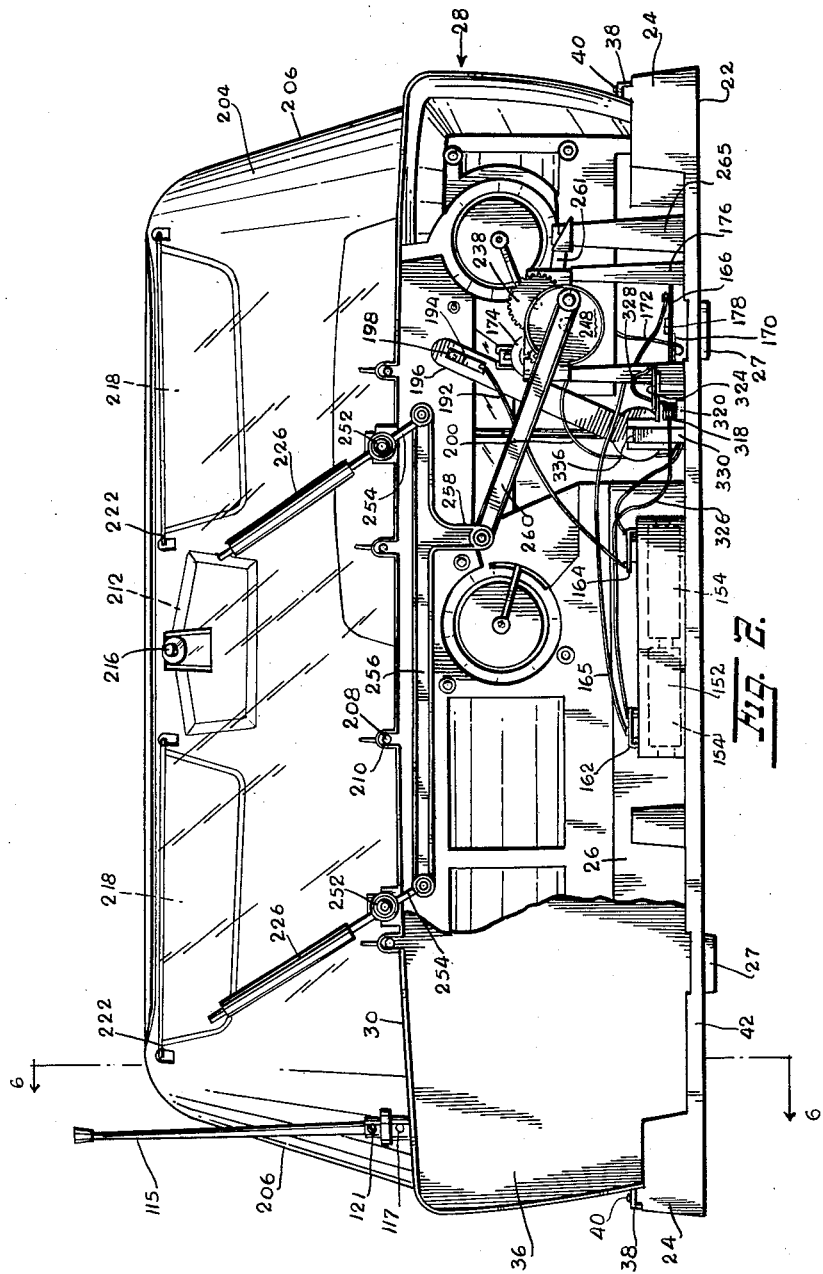
INVENTOR.
HENRY ORENSTEIN
BY
ATTORNEY Feb. 11, 1964 H. ORENSTEIN 3,120,716
SIMULATED AUTOMOBILE DASHBOARD AND CONTROL MEANS
Filed Feb. 19, 1962 5 Sheets-Sheet 3
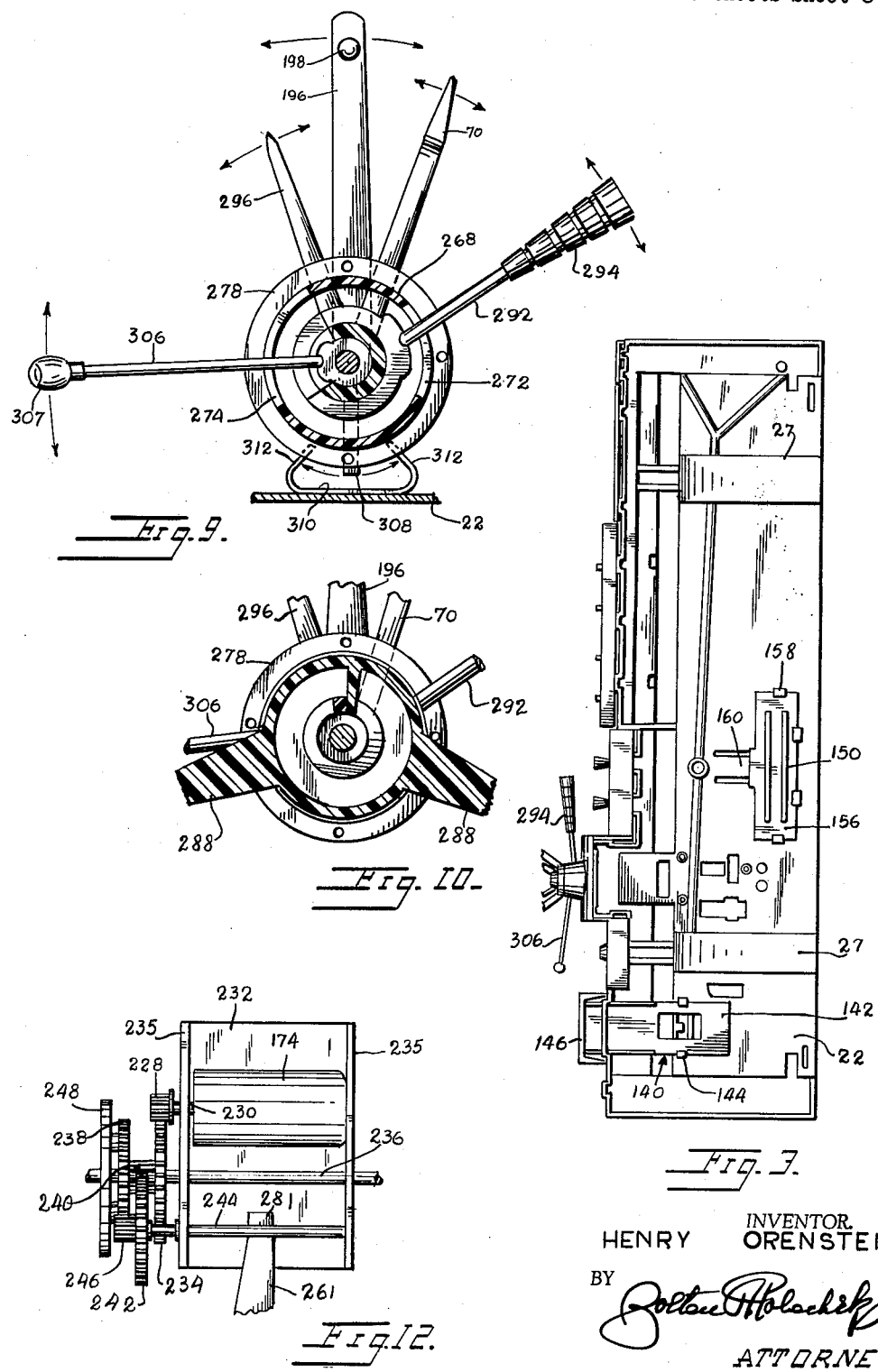
INVENTOR.
HENRY ORENSTEIN
BY
ATTORNEY

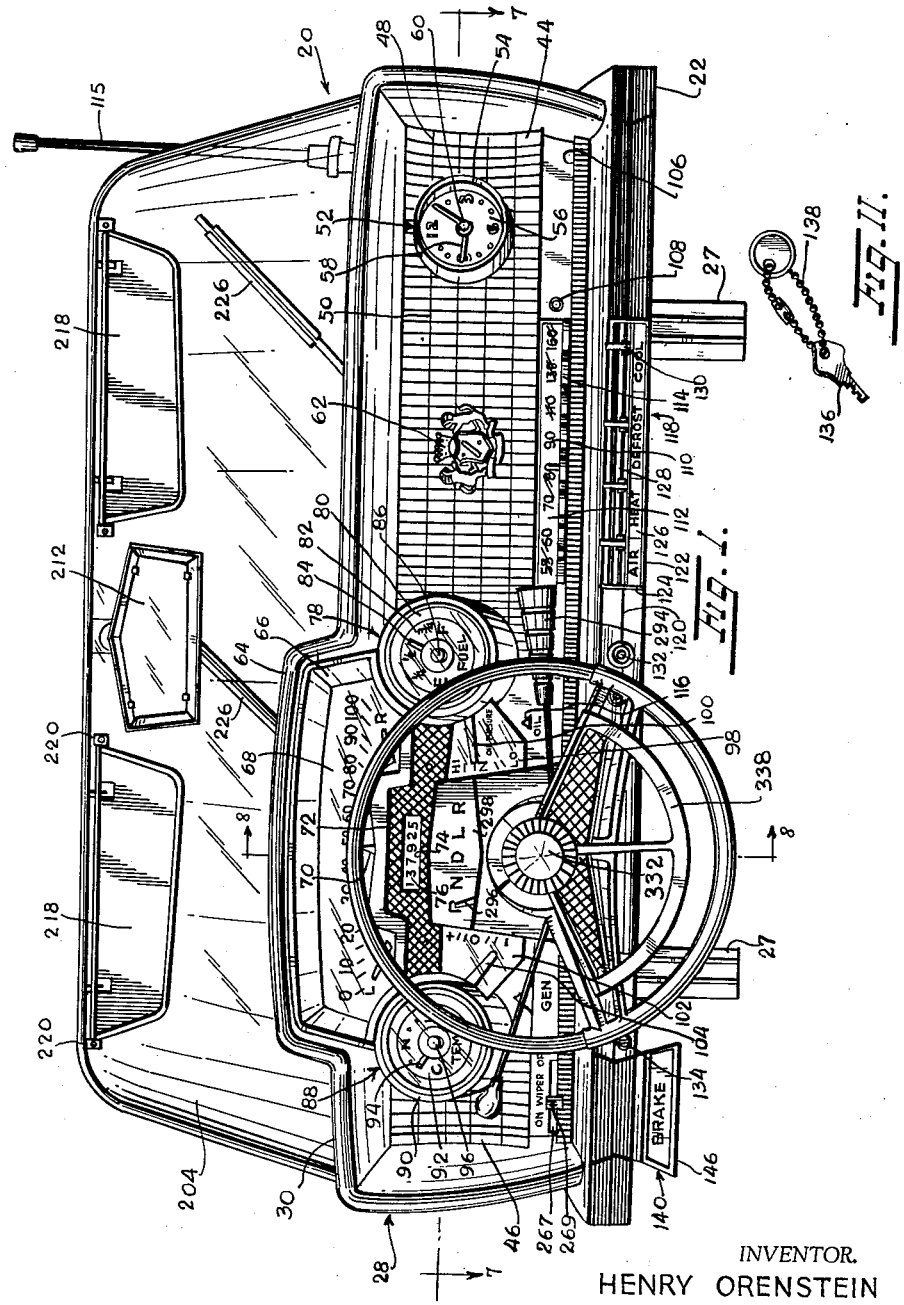

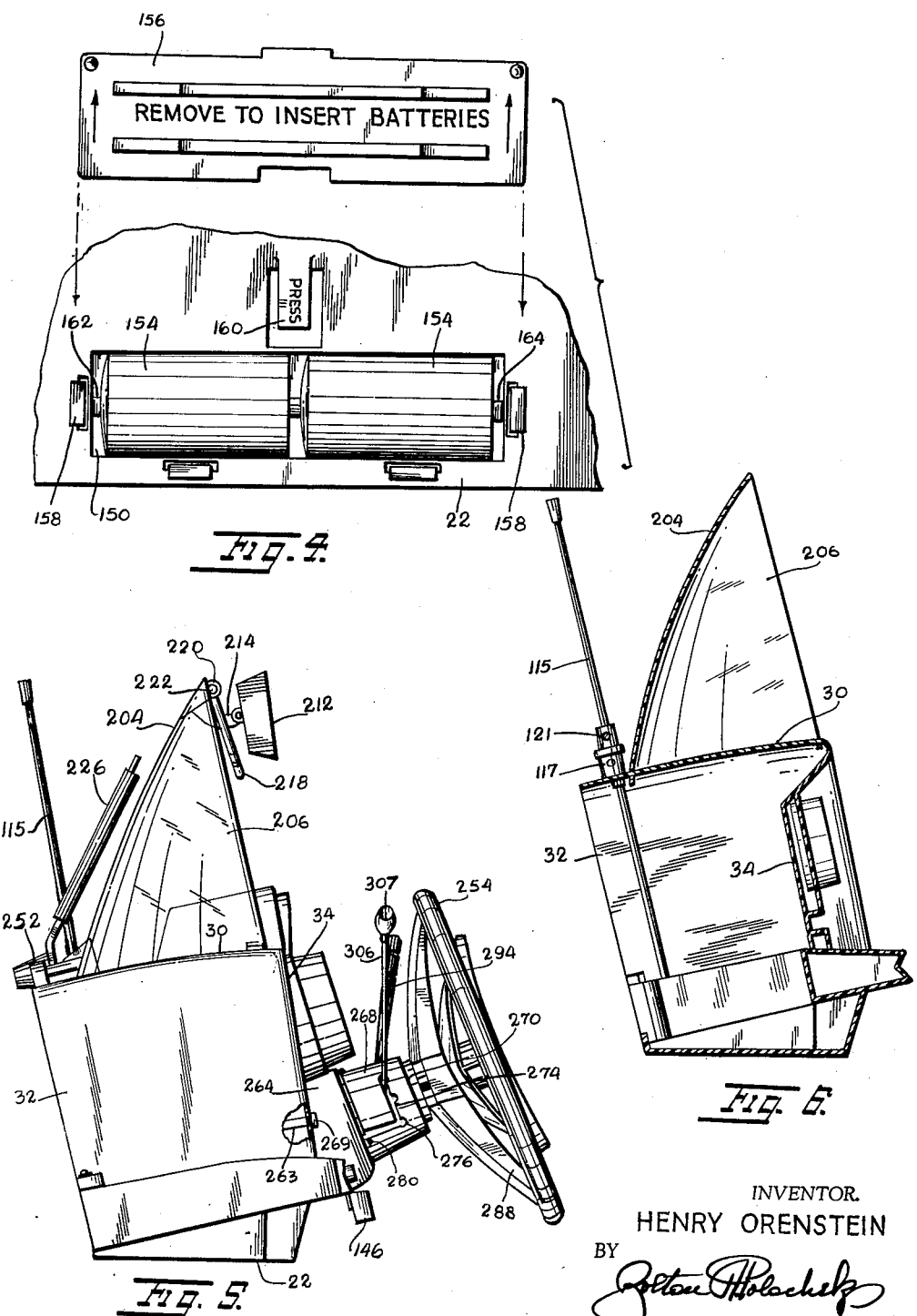

Feb. 11, 1964 H. ORENSTEIN 3,120,716
SIMULATED AUTOMOBILE DASHBOARD AND CONTROL MEANS
Filed Feb. 19, 1962 5 Sheets-Sheet 5
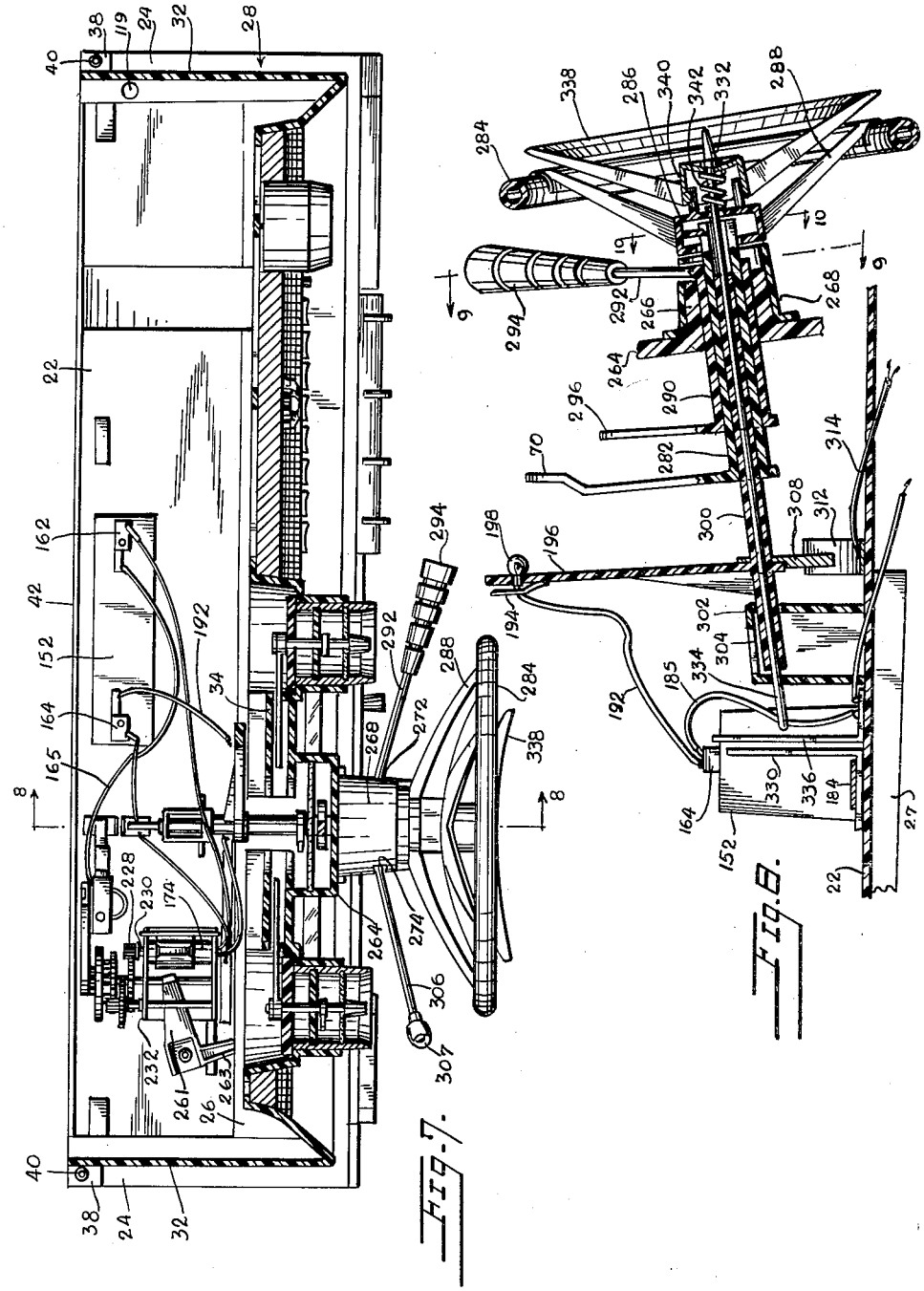
INVENTOR.
HENRY ORENSTEIN
BY
ATTORNEY

United States Patent Office 3,120,716
Patented Feb. 11, 1964

3,120,716
SIMULATED AUTOMOBILE DASHBOARD AND
CONTROL MEANS
Henry Orenstein, Verona, N.J., assignor to De Luxe
Reading Corporation, Newark, N.J., a corporation of
New Jersey
Filed Feb. 19, 1962, Ser. No. 174,028
2 Claims. (Cl. 46—1)

This invention relates generally to a miniature automobile toy and more particularly to a dashboard, windshield and steering wheel assembly of an automobile.

A primary object of the present invention is to provide a play toy in the form of an automobile dashboard, windshield and steering wheel assembly for children that is exciting, amusing, entertaining and instructive.

A further object of the invention is to provide such a play toy that is portable, easily operated and attractive in appearance.

Another object of the invention is to provide a toy with mechanism that simulates a dashboard, a windshield and a steering wheel of an automobile together with mechanism simulating an automobile speedometer, radio and horn.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an enlarged elevational view of a dashboard, steering wheel and windshield assembly of a miniature automobile toy as seen from the driver's seat, embodying the present invention.

FIG. 2 is a rear elevational view thereof, parts being shown broken away.

FIG. 3 is a bottom plan view thereof on a reduced scale.

FIG. 4 is an enlarged front elevational view of the battery compartment, with batteries shown therein, the cover of the compartment being shown in detached position.

FIG. 5 is an end elevational view of the assembly looking from the left of FIG. 1.

FIG. 6 is a vertical sectional view taken on the line 6—6 of FIG. 2.

FIG. 7 is a horizontal sectional view taken on the line 7—7 of FIG. 1.

FIG. 8 is a vertical sectional view taken on the line 8—8 of FIG. 7, parts being omitted.

FIG. 9 is a vertical sectional view taken on the line 9—9 of FIG. 8.

FIG. 10 is a vertical sectional view taken on the line 10—10 of FIG. 8.

FIG. 11 is a perspective view of the ignition key with chain.

FIG. 12 is a detail view showing the windshield wiper driving mechanism.

Referring in detail to the drawings, in FIG. 1 there is illustrated an automobile dashboard, windshield and steering wheel assembly embodying the present invention and designated generally by the reference numeral 20 as it looks from the driver's seat. The assembly is mounted on a rectangular-shaped plastic base 22 having upstanding end flanges 24, 24 and an upstanding flange 26 closely spaced inwardly from the front thereof. A pair of tapering legs 27, 27 support the assembly with the front of the base slightly tilted upwardly.

The dashboard construction for mounting the various instrumentalities is generally indicated at 21 and is protected by a plastic housing 28. The housing comprises a top wall 30, end walls 32, 32 and a front wall 34. A removable plastic cover 36 serves as a rear wall of the housing. The housing is open at the bottom. The housing is secured in position on the flanges by means of integral slotted lugs 38 formed on the end walls adjacent the rear edges thereof and screws 40 passing through the slots in the lugs into the end flanges 24. The cover is held in position by an upstanding flange 42 along the rear edge of the base. The base and housing are preferably of contrasting colors, such as black and red, respectively.

On the face of the dashboard or front wall 34, there are silvered metal plates 44 and 46, serving as facing plates. Each plate is formed with intersecting horizontal and vertical grooves 48 and 50, respectively, to enhance the attractiveness of the plates.

A miniature clock 52 with a silvered metal casing 54 and contrasting colored dial 56 and contrasting colored hands 58 is mounted on the facing plate 44, facing forwardly. A knob 60 permits manual turning of the hands 58.

An ornamental object such as a coat of arms 62 is mounted on the facing plate 44 inwardly of the block. The coat of arms is preferably gold colored.

At the other end of the dashboard, the roof or top wall 30 is raised as indicated at 64 to accommodate the silvered frame 66 of a speedometer 68 with spaced numbers, the numbers representing speeds from 0 to 100 miles per hour. A colored needle 70 moves across the numbers.

A silvered plate 72 with crisscrossed lines is mounted on the face of the dashboard below the speedometer 68. A window 74 is formed in plate 72 showing the mileage covered by the automobile as indicated by the numbers 76.

At one side of the plate 72, there is a fuel gauge 78 comprising a tubular housing 80 projecting forwardly of the dashboard and having a dial 82 in the front, bearing the word "Fuel" and bearing the letters "E" for empty and "F" for full, with the fractions ¼, ½ and ¾. A movable colored needle 84 is adapted to be manually moved over the dial by a knob 86.

At the other end of the plate 72, there is a temperature gauge 88 consisting of a tubular housing 90 projecting forwardly of the dashboard and having a dial 92 in the front, bearing the abbreviation "Temp." for temperature and bearing the letters "C" for cold, "H" for hot, and "N" for neutral. A colored needle 94 is manually movable over the dial by means of a knob 96.

Below the plate 72, at one end thereof, there is a plate 98 with indicia indicating the oil pressure, said indicia comprising "Hi" for high, "Lo" for low and "N" for neutral. A colored needle 100 is manually movable over the indicia by means of the knob 86 on the fuel gauge 78 to which it is connected.

Below the plate 72, at the other end thereof, there is a plate 102 with indicia in the form of plus and minus signs indicating the condition of the battery. A colored needle 104 is manually movable over the indicia by means of the knob 96 on the temperature gauge 88 to which it is connected.

A grooved silvered metal strip 106 finishes off the bottom of the dashboard at its junction with the base 22.

Radio simulating mechanism is provided in the form of a protruding knob 108 in the space between the bottom of the plates 44 and 46 at one end of the dashboard for actuating a supposed radio. The knob is turnable. At one side of the knob on the dashboard there appears numbers indicated at 110 representing radio station identification numbers. These numbers are covered by a glass strip 112. Below the numbers there are colored buttons 114 for decorative purposes only. A radio antenna is supported on the top wall 30 of the housing.

The antenna is movable up and down through a cylindrical bearing member 117 on the top wall 30. The antenna is aligned with a round recess 119 in the adjacent end flange 24 to provide clearance for the up-and-down movement of the antenna. The antenna is held in adjusted position by a set screw 121.

A triangular-shaped window 116 is formed in the dashboard below the plate 98 and below the window there appears the word "Oil." The supposed condition of the oil supply can be seen through this window.

On the base 22, in line with the radio stations, there is a rectangular metal frame 118 consisting of a top wall 120 with a corrugated top surface, a bottom wall 122 and end walls 124, and front wall 126. The front wall is open adjacent the top wall showing a shaft 128 supported by the end walls. A plurality of finger pieces or knobs 130 are slidably mounted on the shaft 128. On the front wall 126 there appears the words "Air," "Heat," "Defrost" and "Cool," with a knob 130 above each word.

A knob 132 is slidably mounted on the front of the base and projects forwardly thereof. This knob supposedly represents a cigarette case.

A slotted rotatable barrel lock 134 for the supposed ignition mechanism is mounted on the base, which lock is actuated by the key 136 shown in FIG. 11 and supported by a chain 138.

Simulated braking mechanism is provided in the form of a slidable brake actuating member 140. The actuating member comprises an elongated rectangular plate 142 supported on and slidable along the undersurface of the base 22 and guided by lugs 144 on the base bent over the plate. A channel-shaped finger piece 146 is formed on the outer end of the plate and protrudes outwardly of the base within easy reach for actuation by the user of the toy. The finger piece bears the word "Brake."

The base 22 is formed with a rectangular-shaped opening 150 which serves as an entrance to an enlargement 152 on the top surface of the base, serving as a compartment for a pair of batteries 154 for illuminating the various parts of the instrumentalities on the dashboard. The opening is closed by a removable and slidable cover 156. The cover is held in closed position by a pair of lugs 158 on the base and a spring finger 160 cut from the material of the base and releasably engaging the edge of the cover. In order to remove the cover, the finger 160 is released from the cover by pressing it inwardly and then sliding the cover away from the lugs 158. The batteries are electrically connected to terminals 162 and 164 in the compartment, which terminals extend outwardly of the top surface of the base.

The terminal 162 is connected by a conductor 165 to the movable contact 166 of an electric switch, the stationary contact 170 of the switch being connected by a conductor 172 to an electric motor 174 mounted on a bracket 176 on the base adjacent one end thereof. The movable contact 166 is actuated by a lever 178 turnable by the barrel lock 134 by means of the key 136. Terminal 164 is connected by a conductor 192 to a contact 194 on the end of a radial arm 196. A lamp bulb 198 is carried by the arm at its end with its central terminal in contact with the contact 194. Terminal 164 is also connected by conductor 200 to the motor 174.

The windshield construction comprises a windshield 204 supported on the top wall 30 of the housing 28. The windshield is formed of transparent plastic material and comprises a rectangular-shaped body with end flanges 206. The body of the windshield slants downwardly and rearwardly as viewed in FIG. 1 and is releasably held on the top wall by means of integral lugs 208 spaced along the bottom edge of the body interlocking with integral loops 210 extending upwardly from the rear edge of the top wall. The windshield extends substantially the length of the top wall.

A rear view mirror 212 is hingedly and adjustably mounted on a bracket 214 supported on the top of the windshield by means of a lug 216 extending through a socketed opening in the windshield. On each side of the rear view mirror, there is a sun visor 218 hingedly supported by a pair of socketed bearings 220 on the windshield receiving stub shafts 222 on the ends of the sun visor.

A pair of windshield wipers 226, 226 is swingably mounted at the front of the windshield for wipingly moving over the body of the windshield. The mechanism for moving the wipers is shown in FIGS. 2, 7 and 12 and is actuated by the motor 174. This mechanism includes a pinion 228 fixed on the protruding end of the motor shaft 230. A train of gearing is mounted on a channel-shaped plate 232 supported on the bracket 176 and is operatively connected to the pinion 228. This gearing includes a gear 234 loosely mounted on a shaft 236 journaled in the flanges 235 of the plate 232 and parallel to the motor shaft 230. Another gear 238 is fixed on shaft 236 spaced from gear 234, and fixed on shaft 236 between gears 234 and 238 is a broad-faced pinion 240 in mesh with a gear 242 on a shaft 244 journaled in the flanges 235 of plate 232. Shaft 244 is parallel to shaft 236 but has one end in an elongated slot in the adjacent flange 235 of plate 232 whereby the shaft with its gear 242 may be moved away from and disconnected from the pinion 240. A broad-faced pinion 246 is fixed on the end of shaft 244 in mesh with the gear 238. A disk 248 is fixed on the end of shaft 236. The drive is brought from the motor 174 to shaft 230, pinion 228, gear 234, pinion 240, gear 242, shaft 244, pinion 246, gear 238, shaft 236 and disk 248.

The windshield wipers 226, 226 are rotatably mounted on bearing studs 252, 252 projecting from the top wall 30 of the housing 28. The windshield wipers have extensions 254 pivotally connected to the end of a slidable bar 256. The bar is formed with a radial lug 258 pivotally connected to one end of a link lever 260, the other end of the link lever being pivotally connected to the disk 248. The windshield wipers 226, 226 are actuated by inserting the key 136 into the switch 134 and turning the switch to close the circuit through the motor 174.

Mechanism is provided for controlling the windshield wiping operation. This mechanism takes the form of an angular lever having legs 261 and 263 disposed at right angles to each other. The lever is pivotally mounted at the juncture of its legs on the top of a post 265 on the base adjacent the bracket 176. Leg 263 protrudes out through a slot 267 in the dashboard and has a knob 269 on its outer end. The other leg 261 has a head 281 engaging the shaft 244 mounting pinion 246 and is adapted to move said shaft with its pinion away from the gear 238 thereby disconnecting the drive to the bar 256 connected to the windshield wipers. When the leg 263 is moved to the end of the slot 267 marked "On," the leg 261 is disconnected from the shaft 244 and the drive to the windshield wipers is connected. When the leg 263 is moved to the end of the slot marked "Off," the leg 261 has engaged the shaft 244 and has moved pinion 246 away from gear 238 thereby disconnecting the drive to the windshield wipers.

A simulated steering wheel construction is shown in detail in FIGS. 8 to 10, inclusive, and includes a hollow bearing block 264 mounted on the front of the base 22 at one end thereof and having a tapered forwardly extending portion 266. Mounted on the extending portion 266, there is the open end of an inverted flower-pot-shaped bearing member 268. The bearing member has an opening in its bottom wall 270 and opposed L-shaped slots 272 and 274 in its side wall. The slots have notches 276 in one long edge wall thereof. A flange 278 on the open end of the bearing member is fixed to the bearing block 264 by screws 280.

A turnable plastic tubular steering post or intermediate sleeve 282 is journaled at its outer end in the extension 266 and in the bottom wall of the bearing member 268.

The inner end of post 282 carries the needle 70 movable over the numbers of the speedometer 68. A plastic steering wheel 284 is formed with a slotted hub portion 286 which is fixed to the outer end of the tubular post 282 and with spokes 288 therebetween. Rotation of the steering wheel thus varies the simulated speed indicated by the needle 70 on speedometer plate 68.

A plastic outer sleeve 290 is positioned around the post 282 and extends through the opening in the bottom wall of the bearing member 268. A simulated gear shift lever 292 with a knob 294 is formed integrally with the outer end of the sleeve 290 and extends through one of the L-shaped slots, slot 272, of the bearing member 268. The inner end of sleeve 290 carries a colored radial gear shift indicator needle 296 which moves over a plate 298 on the dashboard bearing the letters "P," "N," "D," "L" and "R," representing the words "Park," "Neutral," "Drive," "Low" and "Reverse," respectively.

An elongated plastic tubular member 300 extends through the post 282 and outwardly thereof. One end of the tube 300 is journaled in the forward tubular extension 266 of block 264 and the other end in an inverted U-shaped bracket 302 on the base inside the housing. The bracket 302 has an opening 304 in its bight portion. A lever 306 with a knob 307 at its outer end is fixed to the outer end of the tubular member 300 for rotating the tubular member. Lever 306 extends through the other L-shaped slot 274 of bearing member 268. The plastic arm 196 bearing lamp bulb 198 is carried on the tubular member 300 adjacent its inner end. A metal contact 308 is fixed on the bottom end of the arm 196 and depends therefrom. Contact 308 serves as the movable contact of a switch constituted by a metal plate 310 on the base 22, the plate having two upturned bent ends 312 serving as the stationary contacts of the switch. The contacts 312 are in the line of swinging movement of the movable contact 308. Plate 310 is connected by a conductor 314 to the battery 164. Manual movement of the lever 306 swings the arm 196 with the contact 308 into contact with the stationary contacts 312 of the switch thereby closing the circuit through the bulb 198 carried by the arm 196, illuminating either the right or left turn indicia at the opposite ends of the speedometer plate 68 (see FIG. 11).

The lever 292 simulates a gear shift lever and by shifting this lever up or down to the letters "P," "N," "D," "L" and "R" the lever can be shifted into park, neutral, drive, low, or reverse thereby simulating such operations with a conventional automobile. The notches 276 hold the lever in moved adjusted position.

A buzzer device in simulation of a horn is also provided on the base 22 inside the housing 28. This buzzer device includes a solenoid 318 on a metal plate 320 insulated therefrom by an insulating washer. One end of plate 320 is connected to an armature 324 extending over the core of the solenoid 318. The coil is connected to the terminal 162 by a conductor 326 and the coil is connected to the armature 324 by a conductor 328. Metal plate 320 is connected to the stationary contact 330 of a switch controlling the buzzer device, and actuated by a button 332 on the end of an elongated rod 334 extending from the steering wheel 284 through the opening in the bottom wall of bearing member 268 and through the tubular member 300 to a point closely adjacent the movable contact 336 of the buzzer switch. The rod is slidably movable into contact with the movable contact 336 in order to move said contact into engagement with stationary contact 330 thereby closing the circuit through the buzzer device and "blowing" the horn. A segment 338 of a wheel has a hub portion 340 connected to the rod 334 for sliding the rod. A coiled spring 342 having one end fixed to the hub 286 portion of the steering wheel 284 and its other end impinging against the button 332 and segment 338 holds the rod away from the movable contact 336.

It will be seen from the disclosure herein that I have provided a toy that simulates the automobile dashboard with its instruments, the windshield with its associated parts, and the steering wheel with associated parts, together with a horn, speedometer, temperature and fuel gauges, battery and oil markers, temperature indicators, radio, clock, and braking mechanism, in an attractive arrangement which will prove exciting, interesting and instructive to young and old.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A toy comprising a miniature simulated motor vehicle dashboard, a bearing carried by said dashboard, a simulated steering column assembly including an outer sleeve rotatably mounted in said bearing, a simulated gear shift lever fixed to said outer sleeve, a plate bearing gear shift indicia mounted on said dashboard, a needle fixed to said outer sleeve adjacent said plate, whereby movement of said gear shift lever moves said needle to indicate a simulated change in gear position, an intermediate sleeve mounted interiorly of and coaxial with said outer sleeve, a steering wheel hub carrying a steering wheel fixed to said intermediate sleeve, a translucent speedometer plate bearing numerals indicative of speed in miles per hour mounted on said dash, a second needle fixed to said intermediate sleeve adjacent said speedometer plate and movable upon movement of said steering wheel to vary the simulated indication of miles per hour, an inner sleeve mounted interiorly of said intermediate sleeve and coaxial with said outer and intermediate sleeves, an arm fixed to said inner sleeve and extending upwardly behind said translucent speedometer plate, a light bulb carried by said arm, left and right turn indicia at opposite ends of said speedometer plate, a movable contact fixed to said arm, fixed contacts at the opposite ends of the path of travel of said movable contact, a battery, a circuit connecting said bulb to said battery and including said fixed and movable contacts, a turn indicator lever fixed to said inner sleeve and extending outwardly through slots in said intermediate and outer sleeves, whereby movement of said turn indicator lever moves said movable contact to close said circuit at the extreme right and left hand limits of its rotative travel to illuminate said right and left turn indicia respectively, a rod extending through said inner sleeve and said hub and linearly movable therethrough, a simulated horn activating ring carried by the said end of said rod adjacent said steering wheel, a buzzer simulating a horn, a circuit including a fixed contact and a movable contact connecting said buzzer to said battery, said movable contact being positioned in the path of linear travel of said rod whereby pressure on said horn ring closes said last mentioned circuit to energize said buzzer and spring means interiorly of said hub biasing said rod and hence said horn ring outwardly relative to said dashboard normally holding said last mentioned movable contact out of engagement with said second fixed contact.

2. A toy comprising a miniature simulated motor vehicle dashboard, a bearing carried by said dashboard, a simulated steering column assembly including an outer sleeve rotatably mounted in said bearing, a simulated gear shift lever fixed to said outer sleeve, a plate bearing gear shift indicia mounted on said dashboard, a needle fixed to said outer sleeve adjacent said plate, whereby movement of said gear shift lever moves said needle to indicate a simulated change in gear position, an intermediate sleeve mounted interiorly of and coaxial with said outer sleeve, a steering wheel hub carrying a steering wheel fixed to said intermediate sleeve, a translucent speedometer plate bearing numerals indicative of speed in miles per hour mounted on said dash, a second needle fixed to said intermediate sleeve adjacent said speedometer plate and movable upon movement of said steering wheel to vary the simulated indication of miles per hour, an inner sleeve mounted interiorly of said intermediate sleeve and coaxial with said outer and intermediate sleeves, an arm fixed to said inner sleeve and extending upwardly adjacent said translucent speedometer plate, left and right turn indicia at opposite ends of said speedometer plate, a turn indicator lever fixed to said inner sleeve and extending outwardly through slots in said intermediate and outer sleeves whereby movement of said turn indicator lever moves said arm to indicate said right and left turn indicia respectively, a rod extending through said inner sleeve and said hub and linearly movable therethrough, a simulated horn activating ring carried by the end of said rod adjacent said steering wheel, a battery, a buzzer simulating a horn, a circuit including a fixed contact and a movable contact connecting said buzzer to said battery, said movable contact being positioned in the path of linear travel of said rod whereby pressure on said horn ring closes said circuit to energize said buzzer and spring means interiorly of said hub biasing said rod and hence said horn ring outwardly relative to said dashboard normally holding said movable contact out of engagement with said fixed contact.

References Cited in the file of this patent

UNITED STATES PATENTS

| | | |
|---|---|---|
| 971,169 | Buchanan | Sept. 27, 1910 |
| 1,544,728 | Diemer | July 7, 1925 |
| 1,922,746 | Reeder | Aug. 15, 1933 |
| 2,074,875 | Von Voigtlander | Mar. 23, 1937 |
| 2,332,216 | Gold | Oct. 19, 1943 |
| 2,733,543 | Knight | Feb. 7, 1956 |
| 2,775,845 | Coates | Jan. 1, 1957 |